United States Patent [19]
Toyoda et al.

[11] Patent Number: 5,337,177
[45] Date of Patent: Aug. 9, 1994

[54] MICROSCOPE

[75] Inventors: Shuji Toyoda, Yokohama; Satoru Kumagai, Chigasaki, both of Japan

[73] Assignee: Nikon Corporation, Tokyo, Japan

[21] Appl. No.: 947,949

[22] Filed: Sep. 21, 1992

Related U.S. Application Data

[63] Continuation of Ser. No. 737,604, Jul. 25, 1991, abandoned, which is a continuation of Ser. No. 580,182, Sep. 10, 1990, abandoned.

[30] Foreign Application Priority Data

Sep. 13, 1989 [JP] Japan ................... 1-237844

[51] Int. Cl.⁵ .................................. G02B 21/00
[52] U.S. Cl. ......................... 359/384; 359/368; 359/381
[58] Field of Search ............. 350/507, 508, 509, 510, 350/511, 512, 513, 514, 515, 516, 517, 518, 519, 520, 521, 522; 359/368, 392, 394, 382, 284, 381

[56] References Cited

U.S. PATENT DOCUMENTS

| 1,853,674 | 4/1932 | Engelmann | 359/375 |
| 2,135,870 | 11/1938 | Fassin | 359/382 |
| 3,064,529 | 11/1962 | Straat | 359/384 |
| 4,283,111 | 8/1981 | Wieber et al. | 359/381 |
| 4,509,834 | 4/1985 | Hodgson | 359/384 |

FOREIGN PATENT DOCUMENTS

56-135816 10/1981 Japan .

*Primary Examiner*—Loha Ben
*Assistant Examiner*—James Phan
*Attorney, Agent, or Firm*—Shapiro and Shapiro

[57] ABSTRACT

A microscope having an interchangable objective revolver holding a plurality of objectives and supported on a microscope body. The direction of the revolver can be changed by rotating a rotary member through 180° so that a rotation plane surface of the revolver may be inclined downwardly toward the stand side or the operator side of the microscope selectively.

8 Claims, 6 Drawing Sheets

MICROSCOPE

This is a continuation of application Ser. No. 737,604 filed Jul. 25, 1991, which is a continuation of application Ser. No. 580,182, filed Sep. 10, 1990, both now abandoned.

BACKGROUND OF THE INVENTION

1. Field of the Invention

This invention relates to a microscope having an objective revolver and, more particularly, to a microscope having an objective revolver supported on an arm projecting from a microscope stand.

2. Related Background Art

Ordinarily, in a type of microscope having an ocular lens barrel on which an ocular lens is mounted, an objective revolver on which a plurality of objectives are mounted, and a stand formed on a microscope base and having a projecting end portion on which the ocular lens barrel and the objective revolver are mounted, the direction of the objective revolver in the mounted state is such that a rotation plane surface of the objective revolver is inclined downwardly toward the stand or away from the stand. In the case of the type of microscope in which this surface is inclined away from the stand, unused objectives are located on the stand side and are therefore not obstructive to the operations of setting or removing a specimen, marking the specimen, and so on. This type of microscope is therefore advantageous in terms of handling. However, if a large objective is used, it is necessary to incline the rotation plane surface of the objective revolver toward the stand. For this reason, the operability of this type of microscope can be improved if the objective lens revolver is interchangable and if the direction of inclination of the rotation plane surface in the mounted state can be changed.

Japanese Patent Publication No. 56-135816 discloses a microscope capable of inclination of changing the direction of the revolver rotation plane by using an objective lens revolver with a relay lens.

U.S. Pat. No. 4,283,111 discloses a microscope in which the rotation plane surface of the objective revolver is inclined away from the stand, and in which the objective revolver is fixed to the microscope arm without using any relay lens, The microscope disclosed in Japanese Patent Publication No. 56-135816 has an advantage of interchangeability of the objective lens revolver but it requires a relay lens for the objective lens revolver. Accordingly, although no problem is encountered in the case of light field observation with transmission illumination, flare or a ghost occurs owing to the relay lens and impedes observation in the case of fluorescent observation with downlighting illumination or light field observation with reflection light. This microscope also entails the problem in an increase in cost since the relay lens is added.

The microscope disclosed in U.S. Pat. No. 4,283,111 is improved in the operability and in the performance of observing various kinds of specimens. However, the objective lens revolver is not interchangeable and the direction of inclination of the rotation plane surface of the revolver cannot be changed. Another microscope is therefore needed if it is desirable to use a different objective revolver, resulting in an increase in the overall cost of the observation system.

SUMMARY OF THE INVENTION

In view of these problems of the conventional microscopes, an object of the present invention to provide a microscope in which the objective revolver can be interchanged without any relay lens, and in which the direction of inclination of the objective revolver can be changed on the optical axis.

Thus, according to one of its principal aspects, the invention provides a microscope comprising a microscope body for supporting an ocular lens barrel in a predetermined position, a rotary member disposed at a predetermined location on the microscope body for rotation on a rotation axis, and rotary member fixing means for selectively fixing the rotary member in a first position relative to the predetermined position of the ocular lens barrel and a second position to which the rotary member is rotatable relative to the predetermined position through about 180° on its rotation axis from the first position. The microscope further includes objective revolver means comprising a revolver portion supporting a plurality of objective lenses and rotatable to enable selection among the objective lenses for viewing a specimen, and a revolver retaining member supporting the revolver portion such that the revolver portion rotates in a plane inclined at a predetermined angle to an optical axis of the objective revolver means. The revolver retaining member is detachably connectible, by connection means, to the rotary member at the first and second positions of the rotary member, selectively, with a predetermined mutual orientation of the revolver retaining member and the rotary member in which the optical axis of the objective revolver means is coincident with the rotation axis of the rotary member. The arrangement is such that when the revolver retaining member is connected to the rotary member at the first position, the plane of rotation of the revolver portion is inclined downwardly toward an observer viewing a specimen through the ocular lens barrel, and such that when the revolver retaining member is connected to the rotary member at the second position, the plane of rotation of the revolver portion is inclined downwardly away from the observer.

According to a second of its principal aspects, the invention provides a microscope having a microscope body for supporting an ocular lens barrel in a predetermined position, and objective revolver means comprising a revolver portion supporting a plurality of objective lenses and rotatable to enable selection among the objective lenses for viewing a specimen, and a revolver retaining member supporting the revolver portion such that the revolver portion rotates in a plane inclined at a predetermined angle to an optical axis of the objective revolver means. A support member supports the revolver retaining member for rotation on the optical axis of the objective revolver means such that the revolver portion may be rotated, with the revolver retaining member, relative to the support member on the optical axis between two positions about 180° apart. The revolver retaining member may be selectively fixed against rotation relative to the support member at each of the two positions by rotation checking means. The microscope further includes attachment means disposed on the microscope body for detachably receiving the support member with the revolver portion at each of the two positions, selectively, with the optical axis coincident with a specimen viewing axis of the microscope. The arrangement is such that when the support member is received by the attachment means with the revolver portion at one of the two positions, the plane of rotation of the revolver portion is inclined downwardly toward an observer viewing a specimen through the ocular lens barrel, and such that when the support member is received by the attachment means with the revolver portion at the other of the two positions, the plane of rotation of the revolver portion is inclined downwardly away from the observer.

According to yet another of its principal aspects, the invention provides a microscope having a microscope body, and comprising objective revolver means including a revolver portion supporting a plurality of objective lenses and rotatable to enable selection among the objective lenses for viewing a specimen, and a revolver retaining member supporting the revolver portion such that the revolver portion rotates in a plane inclined at a predetermined angle to an optical axis of the objective revolver means. The microscope further includes attachment means for detachably mounting the revolver retaining member on the microscope body with the optical axis of the objective revolver means coincident with a specimen viewing axis of the microscope, the attachment means being constructed such that the revolver retaining member may be dismounted therefrom and thereafter remounted thereto, after rotation through about 180° on the optical axis, by movement in each of only two directions, namely: a first direction perpendicular to the optical axis of the objective revolver means and a second direction opposite to the first direction.

According to still another of its principal aspects, the invention provides a microscope comprising a microscope body for supporting an ocular lens barrel in a predetermined position, and objective revolver means including a revolver portion supporting a plurality of objective lenses and rotatable to enable selection among the objective lenses for viewing a specimen, and a revolver retaining member supporting the revolver portion such that the revolver portion rotates in a plane inclined at a predetermined angle to an optical axis of the objective revolver means. Support means are disposed on the microscope body for supporting the revolver retaining member with the objective revolver means disposed in a space defined by a mounting portion of the microscope body, and with the optical axis of the objective revolver means coincident with a specimen viewing axis of the microscope. The support means support the revolver retaining member for rotation by at least about a half revolution on the optical axis between a first position in which the plane of rotation of the revolver portion is inclined downwardly toward an observer viewing a specimen through the ocular lens barrel and a second position in which the plane of rotation of the revolver portion is inclined downwardly away from the observer, the space defined by the mounting portion being dimensioned to accommodate the objective revolver means when the revolver retaining member is rotated as aforesaid. Fixing means are provided for selectively fixing the revolver retaining member in each of the first and second positions.

Other objects, features and effects of the present invention will become apparent from the following detailed description of the invention taken in conjunction with the accompanying drawings.

DESCRIPTION OF THE PREFERRED EMBODIMENTS

Embodiments of the present invention will be described below in detail with reference to the accompanying drawings.

Figure 1:
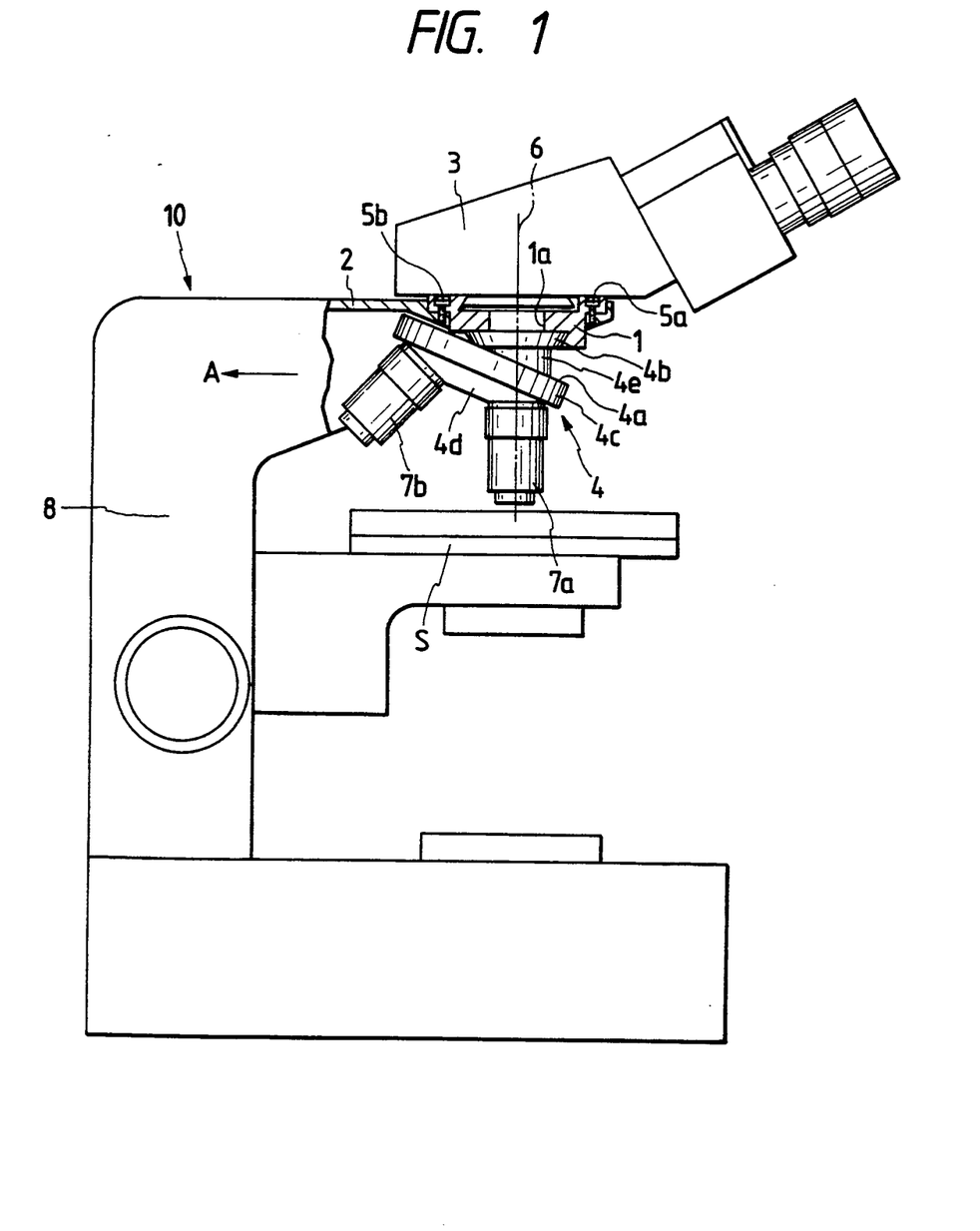
FIG. 1 is a partially cutaway side view of a microscope which represents a first embodiment of the present invention, showing the overall construction of the microscope.
Figure 2:
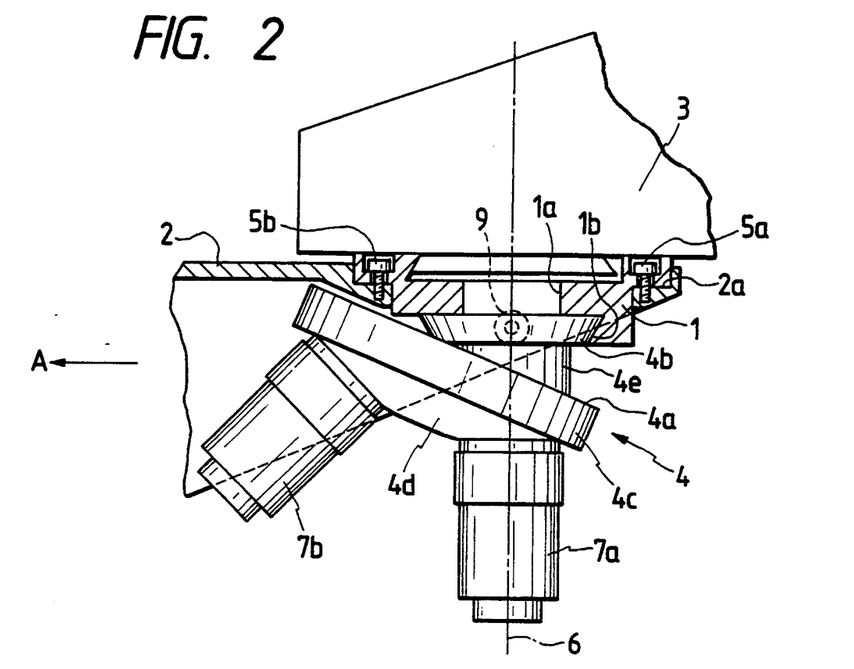
FIG. 2 is a partially cutaway side view of principal portions of the first embodiment of FIG. 1, including the objective revolver.
Figure 3:
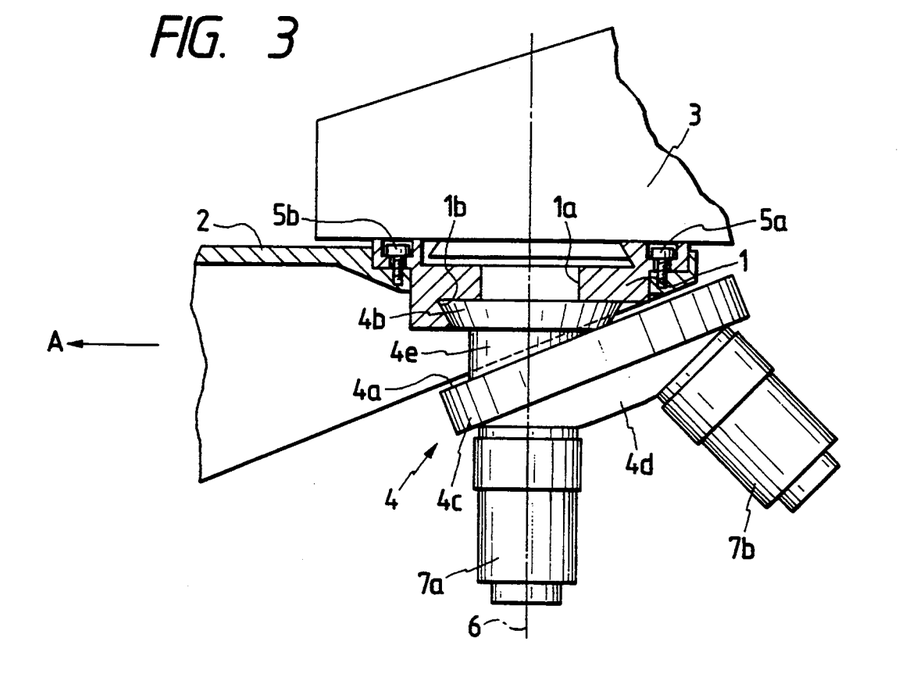
FIG. 3 is a partially cutaway side view of the objective revolver shown in FIG. 2, in which the direction of the plane of rotation of the objective revolver is changed.

Referring FIGS. 1, 2, and 3, a first embodiment of the present invention is illustrated. An objective revolver (hereinafter referred to simply as "revolver") 4 is constituted by a fixture member (retaining member) 4e having an attachment mount 4b described later in detail, a rotary operation member 4c for interchanging objectives, and a lens mount member 4d to which objectives 7a and 7b are fixed by screwing.

The attachment mount is a male round dovetail having a conical shape. A revolver retaining member 1 has a through hole 1a formed at its center and through which a bundle of observation rays pass, and a female round dovetail 1b in which the male dovetail of the attachment mount 4b is fitted. To enable the male dovetail attachment mount 4b to be detachably attached to the revolver retaining member 1, the female round dovetail 1b is cut out on the side remote from the operator (on the left-hand side as viewed in FIG. 2) so as to have a horseshoe-like shape. After being inserted and fitted in the female dovetail 1b of the revolver retaining member 1, the attachment mount 4b is detachably fixed to the revolver receiving member 1 by a fixing screw member (e.g., a small clamp screw) 9 provided in a side portion of the revolver receiving member 1. In this case, the attachment mount 4b is fixed by being pressed against an inner peripheral surface of the female dovetail. The revolver receiving member 1 is placed on a placement surface 2a which is formed in an arm 2 forming a part of a microscope body 10 and which is perpendicular to the objective optical axis 6, and is thereafter fixed to the microscope arm 2 by small screws 5a and 5b provided as fixing members. The arm 2 of course also supports an ocular lens barrel 3. The revolver receiving member 1 is rendered rotatable on a plane perpendicular to the optical axis 6 of the objective 7a in the used position by unscrewing the small screws 5a and 5b.

Referring to FIG. 2, a surface 4a of the revolver 4 corresponding to the plane of rotation of the revolver is inclined to a front side in a direction opposite to the direction of the arrow A, away from a stand 8 (shown in FIG. 1) to which the arm 2 is connected, with the unused objective 7b disposed toward the stand 8. To set the revolver 4 as shown in FIG. 3, the fixing screw member 9 is unscrewed and the revolver 4 is moved toward the stand 8 to disengage the dovetail fitting. The small screws 5a and 5b are thereafter unscrewed and the revolver receiving member 1 is rotated through 180° on the optical axis 6. The small screws 5a and 5b are then screwed again to fix the revolver receiving member 1 to the arm 2. The male dovetail of the attachment mount 4b of the revolver 4 is thereafter fitted from the extreme end side of the arm 2 into the female dovetail 1b of the revolver receiving member 1.

Referring to FIG. 3, the rotation plane surface 4a of the revolver 4 is inclined toward the stand 8 (in the direction of the arrow A), with the unused objective 7b disposed in a direction away from the direction of the stand 8.

In the thus-constructed microscope, the mounted position of the objective 7a in the direction of the optical axis 6 is fixed irrespective of whether the rotation plane surface 4a is inclined toward the stand 8 as shown in FIG. 3 or inclined in a direction away from the stand 8 as shown in FIG. 2, and there is therefore no need for any auxiliary lens such as a relay lens even though the direction of inclination of the rotation plane surface 4a is changed. Moreover, since the revolver is mounted or dismounted by being moved in the longitudinal direction of the arm 2, there is no need for formation of a relief portion in a side surface of the arm 2, and the size of the arm 2 in the direction perpendicular to the plane of FIG. 1 can be reduced while maintaining the desired strength of the arm 2.

Figure 4:
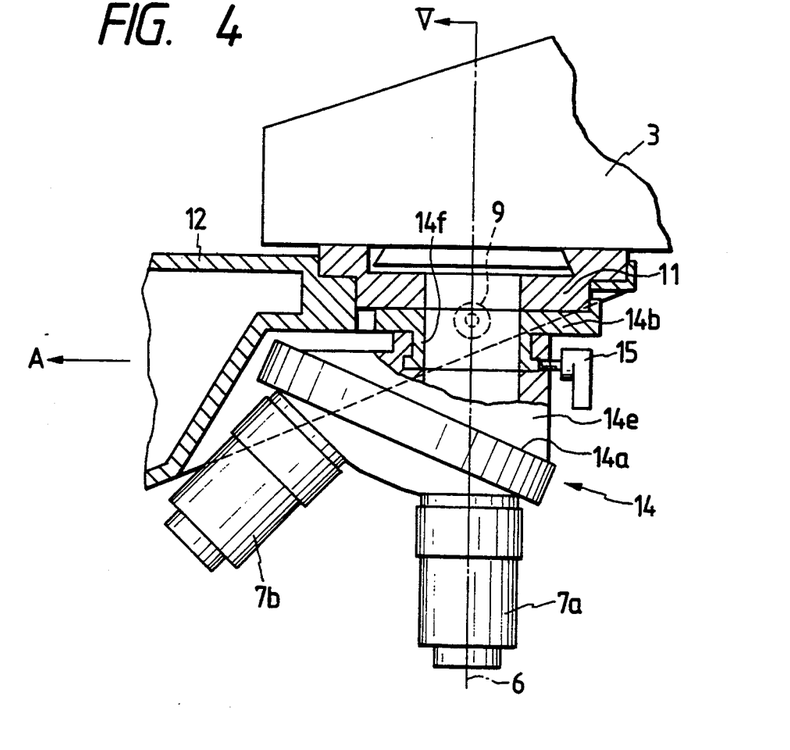
FIG. 4 is a partially cutaway side view of an objective revolver and other principal portions of a second embodiment of the present invention.
Figure 5:
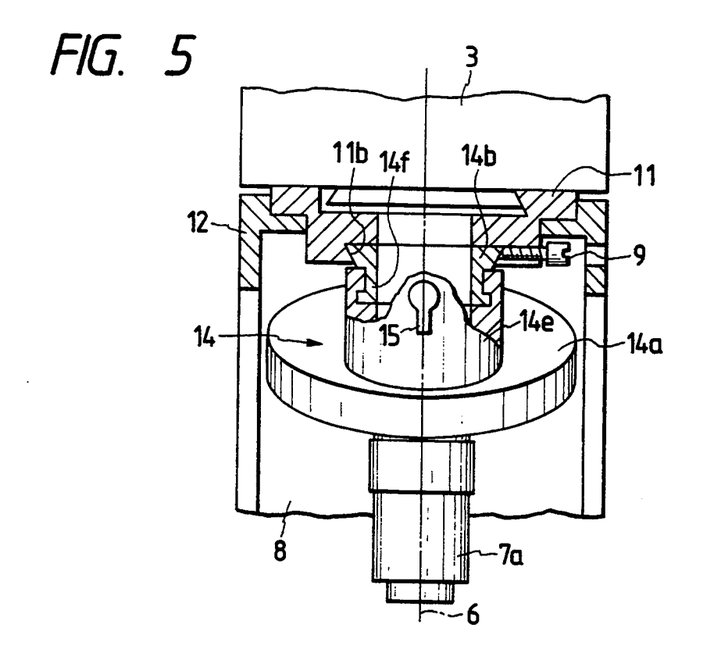
FIG. 5 is a cross-sectional view taken along the line V—V of FIG. 4.
Figure 6:
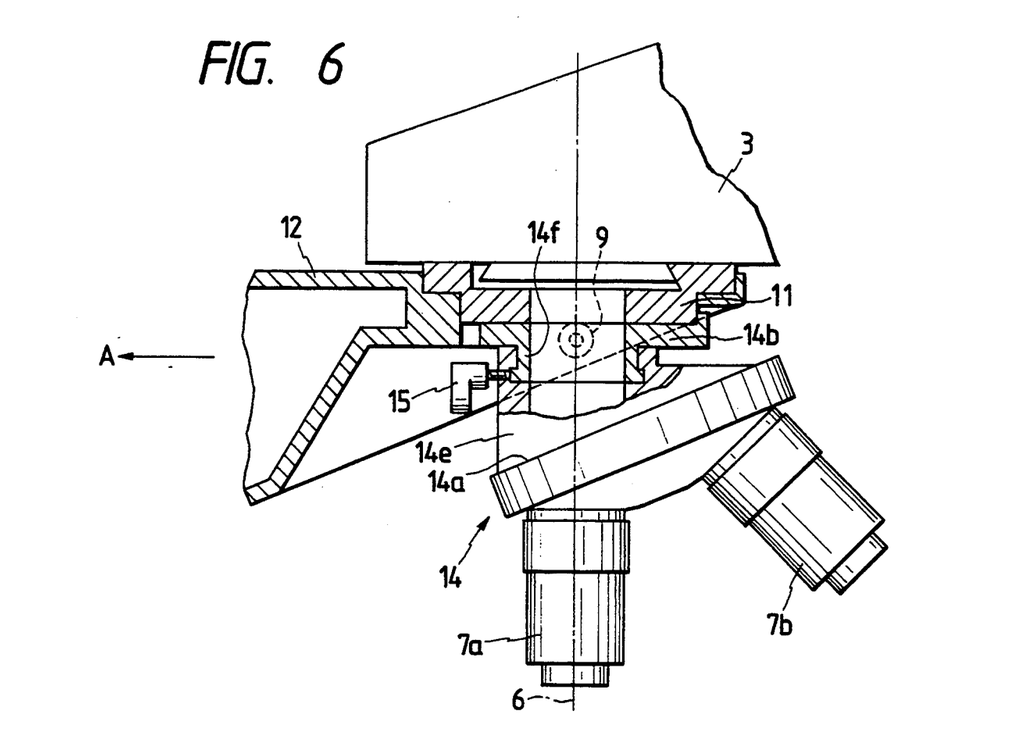
FIG. 6 is a partially cutaway side view of the objective revolver shown in FIG. 4, in which the direction of the plane of rotation of the objective revolver is changed.

FIGS. 4, 5, and 6 show a second embodiment of the present invention. Components of this embodiment having the same functions as those of the first embodiment are indicated by the same reference characters and will not be described in detail. A guide channel 11b having a dovetail-like cross-sectional shape such as that shown in FIG. 5 is formed in a revolver receiving member 11 so as to extend in a direction perpendicular to the optical axis 6. An attachment mount 14b of a revolver 14 is an engagement member having a male dovetail portion having a complementary cross-sectional shape to the guide channel 11b. The attachment mount 14b of the revolver 14 has a cylindrical portion 14f on which a flange is formed at its extreme end, and the revolver 14 has a fixture member (retaining member) 14e which is attached to and supported on the cylindrical portion 14f so as to be rotatable relative to the same on a plane perpendicular to the objective optical axis 6. The fixture member 14e may be fixed against such rotation by a fixing clamp member 15 such as a clamp screw. The attachment mount 14b is detachably fixed to the revolver receiving member 11 by a fixing screw member 9.

Referring to FIG. 4, a rotation plane surface 14a of the revolver 14 is inclined to a front side in a direction opposite to the direction of the stand (of the arrow A), with the unused objective 7b facing the stand. To set the revolver 14 as shown in FIG. 6, the fixing screw member 9 is unscrewed and the revolver 14 is moved in a direction toward the extreme end of an microscope arm 12 (in the direction of the right-hand side of FIG. 4) to disengage the attachment mount 14b from the revolver receiving member 11. The fixing clamp member 15 is then loosened and the attachment mount 14b of the revolver 14 is rotated through 180° relative to the fixture member 14e and is fixed by the fixing clamp member 15. The male dovetail of the attachment mount 14b is thereafter fitted into the female dovetail 11b of the revolver receiving member 11 from the extreme end side of the microscope arm 12, and the fixing screw member 9 is screwed to fix the attachment mount 14b.

Referring to FIG. 6, the rotation plane surface 14a of the revolver 14 is inclined to the stand 8 side (in the direction of the arrow A), with the unused objective 7b facing in a direction opposite to the direction of the stand 8.

In the case of the second embodiment also, the position of the objective 7a mounted to the revolver 14 in the direction of the optical axis 6 is fixed, and there is therefore no need for a known relay lens or the like even though the direction of the revolver 14 is changed. It is easy to turn the revolver because the direction of the revolver can be changed by rotating the attachment mount 14b.

Figure 7:
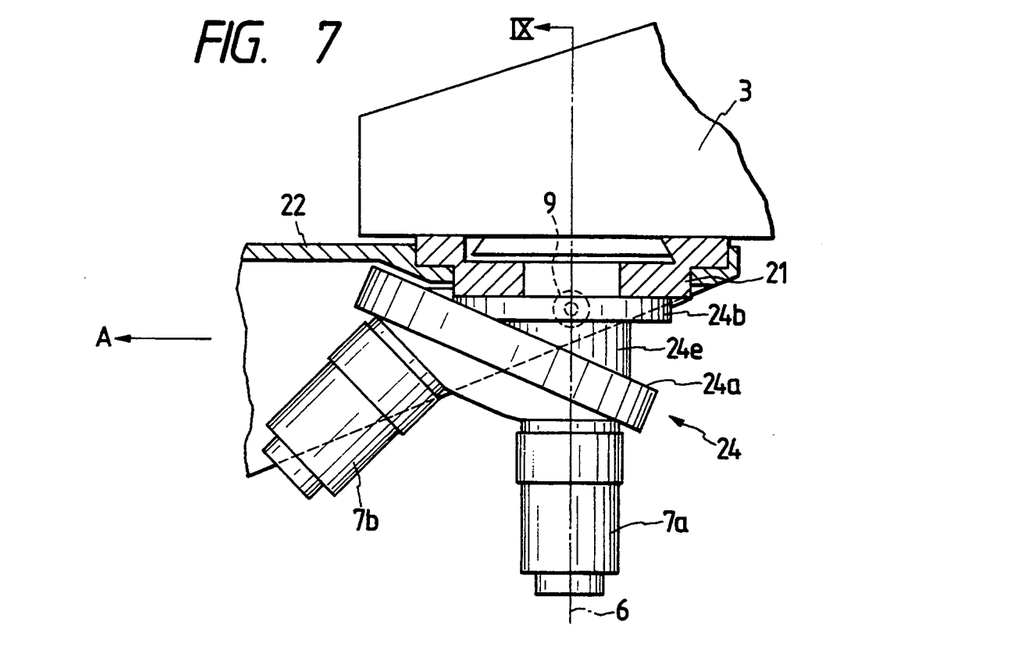
FIG. 7 is a partially cutaway side view of an objective revolver and other principal portions of a third embodiment of the present invention.
Figure 8:
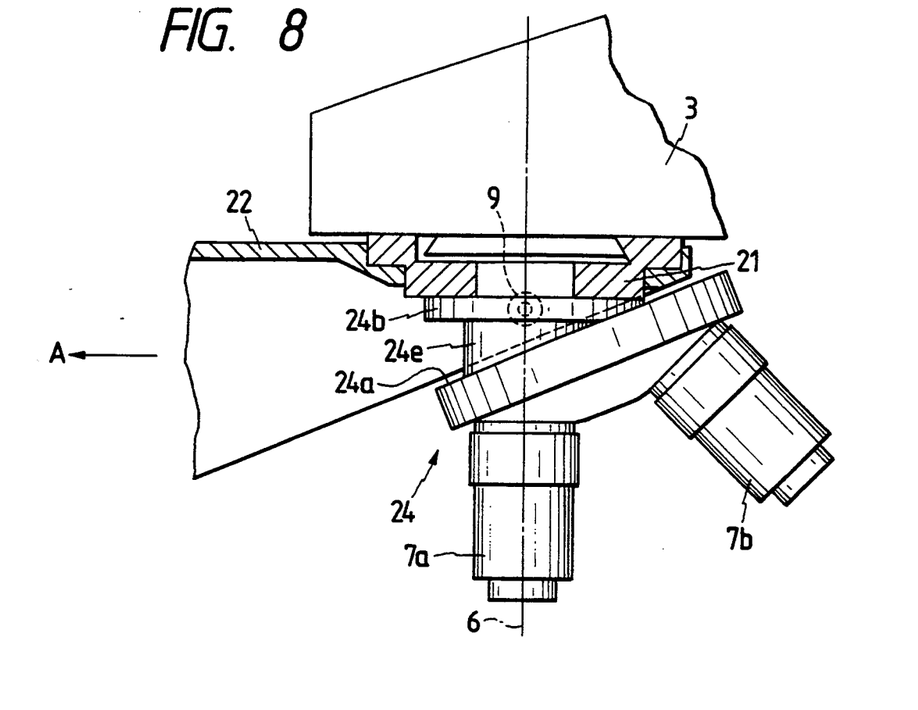
FIG. 8 is a partially cutaway side view of the objective revolver shown in FIG. 7, in which the direction of the plane of rotation of the objective revolver is changed.
Figure 9:
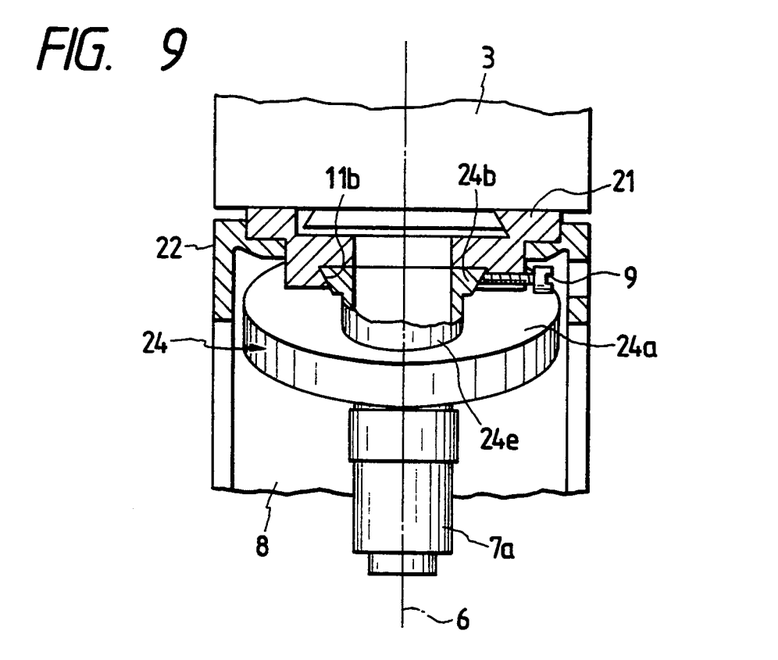
FIG. 9 is a cross-sectional view taken along the line IX—IX of FIG. 7.

FIGS. 7 to 9 show a third embodiment of the present invention. Components of this embodiment having the same functions as those of the first embodiment are indicated by the same reference characters and will not be described in detail. Referring to FIG. 9, a revolver receiving member 21 has a guide channel 11b having the same dovetail-like cross-sectional shape as that of the second embodiment, and an attachment mount 24b on a fixture member (retaining member) 24e of a revolver 24 is an engagement member having a male dovetail portion having a complementary cross-sectional shape to the guide channel 11b of the revolver receiving member 21. The attachment mount 24b is detachably fixed in the revolver receiving member 21 by a fixing screw member 9.

Referring then to FIG. 7, a rotation plane surface 24a of the revolver 24 is inclined to a front side in a direction opposite to the direction (of the arrow A) of the stand 8, with the unused objective 7b facing the stand 8. To set the revolver 4 as shown in FIG. 8, the fixing screw member 9 is unscrewed and the revolver 24 is moved toward the stand 8 (in the direction of the arrow A) to disengage the attachment mount 24b from the revolver receiving member 21. The revolver 24 is turned through 180° on the optical axis 6, the male dovetail portion of the attachment mount 24b is inserted into the female dovetail 11b of the revolver receiving member 21 from the extreme end side of a microscope arm 22, and the fixing screw member 9 is screwed to fix the attachment mount 24b.

Referring to FIG. 8, the rotation plane surface 24a of the revolver 24 is inclined to the stand 8 side (in the direction of the arrow A), with the unused objective 7b facing in a direction opposite to the direction of the stand 8.

In the third embodiment shown in FIGS. 7 to 9, the revolver receiving member 21 and the attachment mount 24b are connected by dovetail connection using dovetails extending in a direction perpendicular to the objective optical axis 6, as in the case of the second embodiment. However, these members may be connected by using, instead of dovetail connection, cylindrical portions coaxial with the objective optical axis 6 and detachably fitted to each other, as in the case of a fourth embodiment described below with reference to FIGS. 10 and 11.

Figure 10:
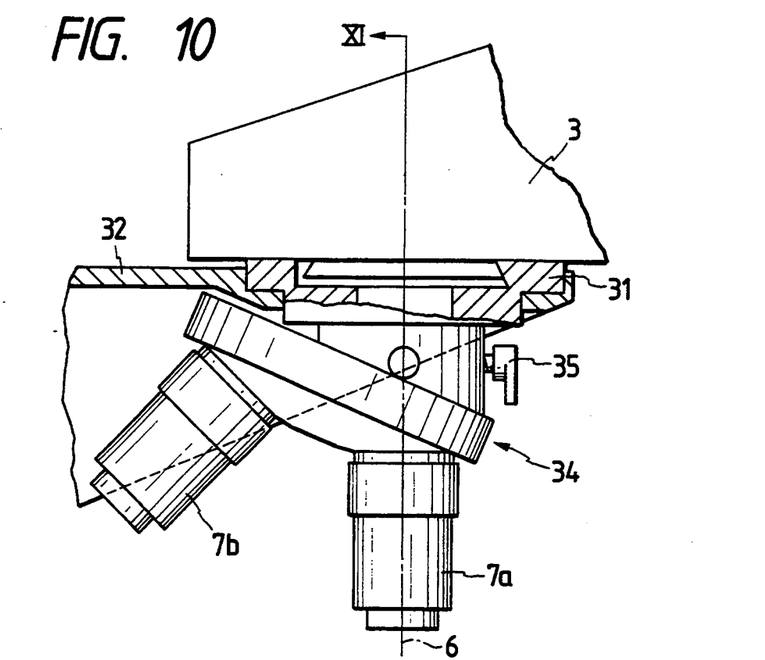
FIG. 10 is a partially cutaway side view of an objective revolver and other principal portions of a fourth embodiment of the present invention.
Figure 11:
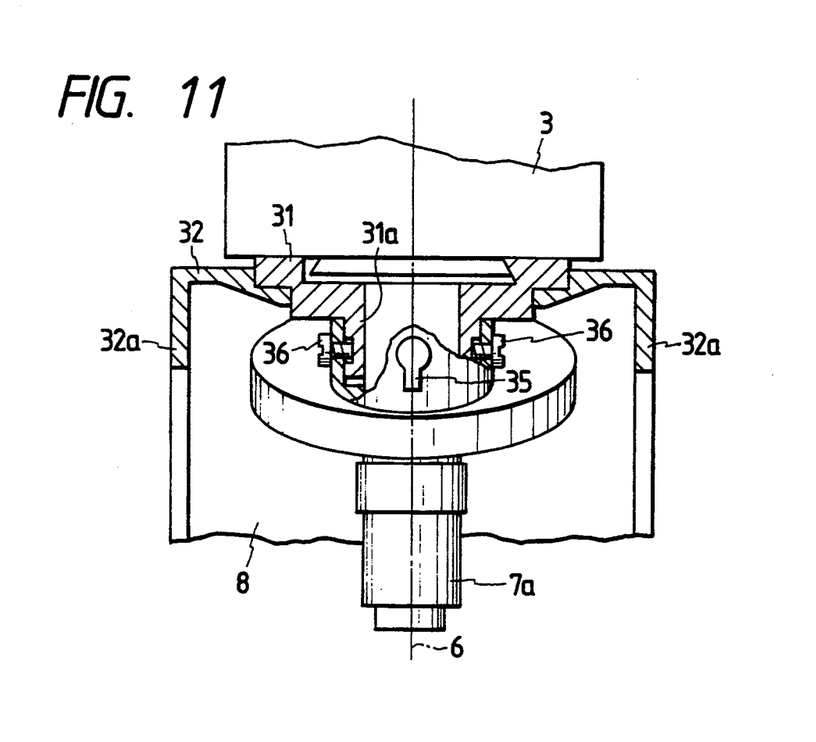
FIG. 11 is a cross-sectional view taken along the line XI—XI of FIG. 10.

In the embodiment of FIGS. 10 and 11, a cylindrical shaft portion 31a of a revolver receiving member 31 is fitted to an inner cylindrical surface of a cylindrical attachment mount (retaining member) 34b and is fixed by a clamp screw 35 after a microscope mirror mount S (refer to FIG. 1) has been moved downward. Components of this fourth embodiment corresponding to those of the third embodiment are indicated by the same reference characters, and the description thereof will not be repeated.

For this cylinder connection, as shown in FIG. 11, a circular groove is formed in the cylindrical shaft portion 31a of the revolver receiving member 31, and pin-like extreme ends of a plurality of special screws which are screwed in the attachment mount 34b to prevent the same from coming off are fitted in this circular groove. A rotary operation member 34c of the revolver 34 is rotated with an eccentricity on the optical axis 6 of the objective 7a. Rims 32a are formed on opposite side portions of an arm 32 at a relatively large distance from each other in consideration of this eccentricity, as shown in FIG. 11. The direction of the rotation plane surface of the revolver can therefore be changed without removing the revolver from the revolver receiving member, unlike the first to third embodiments.

In this case, the direction of the revolver 34 can be changed by only an operation of unscrewing a clamp screw 35 and rotating the revolver 34 on the optical axis 6.

In the embodiments shown in FIGS. 1 to 3, 4 to 6, and 7 to 9, the same revolver is remounted while changing the direction. However, it is not always necessary to set the same revolver; the revolver can be interchanged with another revolver.

Although the above-described embodiments have been described in connection with erected type microscopes, the present invention can also be applied to inverted type microscopes.

According to the present invention, as described above, a microscope can be provided at a low cost which can be suitably used for observation of various kinds of specimens, which is improved in operability at the time of setting and removing specimens, and in which the revolver can be interchanged and can be changed in the direction of attachment without using any auxiliary lens such as a relay lens.

We claim:

1. A microscope comprising:
    a microscope body for supporting an ocular lens barrel in a predetermined position,
    a rotary member disposed at a predetermined location on said microscope body for rotation on a rotation axis,
    rotary member fixing means for selectively fixing said rotary member in a first position relative to said predetermined position of said ocular lens barrel and a second position to which said rotary member is rotatable relative to said predetermined position through about 180° on said rotation axis from said first position,
    objective revolver means comprising a revolver portion supporting a plurality of objective lenses and rotatable to enable selection among said objective lenses for viewing a specimen, and a revolver retaining member supporting said revolver portion such that said revolver portion rotates in a plane inclined at a predetermined angle to an optical axis of said objective revolver means, and
    connection means for detachably connecting said revolver retaining member to said rotary member at said first and second positions of said rotary member, selectively, with a predetermined mutual orientation of said revolver retaining member and said rotary member in which said optical axis of said objective revolver means is coincident with said rotation axis of said rotary member, such that when said revolver retaining member is connected to said rotary member at said first position said plane of rotation of said revolver portion is inclined downwardly toward an observer viewing a specimen through said ocular lens barrel, and such that when said revolver retaining member is connected to said rotary member at said second position said plane of rotation of said revolver portion is inclined downwardly away from the observer.

2. A microscope according to claim 1, wherein said connection means includes a male dovetail and a cooperable dovetail channel each disposed on a respective one of said revolver retaining member and said rotary member, said dovetail channel being oriented to receive said male dovetail in a direction perpendicular to said axis of said rotary member.

3. A microscope comprising:
    a microscope body for supporting an ocular lens barrel in a predetermined position,
    objective revolver means comprising a revolver portion supporting a plurality of objective lenses and rotatable to enable selection among said objective lenses for viewing a specimen, and a revolver retaining member supporting said revolver portion such that said revolver portion rotates in a plane inclined at a predetermined angle to an optical axis of said objective revolver means, and
    a support member supporting said revolver retaining member for rotation on said optical axis of said objective revolver means such that said revolver portion is rotatable, with said revolver retaining member, relative to said support member on said optical axis between two positions about 180° apart,
    rotation checking means for selectively fixing said revolver retaining member against rotation relative to said support member at said two positions, and
    attachment means disposed on said microscope body for detachably receiving said support member with said revolver portion at each of said two positions, selectively, with said optical axis coincident with a specimen viewing axis of the microscope, such that when said support member is received by said attachment means with said revolver portion at one of said two positions said plane of rotation of said revolver portion is inclined downwardly toward an observer viewing a specimen through said ocular lens barrel, and such that when said support member is received by said attachment means with said revolver portion at the other of said two positions said plane of rotation of said revolver portion is inclined downwardly away from the observer.

4. A microscope according to claim 3, wherein said attachment means includes a dovetail channel and a male dovetail each disposed on a respective one of said microscope body and said support member, said male dovetail being insertable into said dovetail channel in a direction perpendicular to said optical axis of said objective revolver.

5. A microscope having a microscope body, and comprising:

objective revolver means comprising a revolver portion supporting a plurality of objective lenses and rotatable to enable selection among said objective lenses for viewing a specimen, and a revolver retaining member supporting said revolver portion such that said revolver portion rotates in a plane inclined at a predetermined angle to an optical axis of said objective revolver means, and attachment means for detachably mounting said revolver retaining member on said microscope body with said optical axis of said objective revolver means coincident with a specimen viewing axis of the microscope, said attachment means being constructed such that said revolver retaining member is dismountable therefrom and thereafter remountable thereto, after rotation through about 180° on said optical axis, by movement in each of only two directions, namely: a first direction perpendicular to said optical axis of said objective revolver means and a second direction opposite to said first direction.

6. A microscope according to claim 5, wherein said attachment means includes a dovetail channel and a male dovetail each formed on a respective one of said microscope body and said revolver retaining member, said male dovetail being insertable into said dovetail channel in a direction perpendicular to said optical axis of said objective revolver.

7. A microscope comprising:

a microscope body for supporting an ocular lens barrel in a predetermined position, objective revolver means comprising a revolver portion supporting a plurality of objective lenses and rotatable to enable selection among said objective lenses for viewing a specimen, and a revolver retaining member supporting said revolver portion such that said revolver portion rotates in a plane inclined at a predetermined angle to an optical axis of said objective revolver means, support means disposed on said microscope body for supporting said revolver retaining member with said objective revolver means disposed in a space defined by a mounting portion of said microscope body, and with said optical axis of said objective revolver means coincident with a specimen viewing axis of the microscope, said support means supporting said revolver retaining member for rotation by at least about a half revolution on said optical axis between a first position in which said plane of rotation of said revolver portion is inclined downwardly toward an observer viewing a specimen through said ocular lens barrel and a second position in which said plane of rotation of said revolver portion is inclined downwardly away from the observer, said space defined by said mounting portion being dimensioned to accommodate said objective revolver means when said revolver retaining member is rotated as aforesaid, and fixing means for selectively fixing said revolver retaining member in each of said first and second positions.

8. A microscope comprising:

a microscope body;

an ocular lens barrel supported in a predetermined position on said microscope body;

objective revolver means comprising a revolver portion supporting a plurality of objective lenses and rotatable to enable selection among said objective lenses for viewing a specimen, and a revolver retaining member supporting said revolver portion such that said revolver portion rotates in a plane inclined at a predetermined angle to an optical axis of said objective revolver means, attachment means for detachably mounting said revolver retaining member on said microscope body with said optical axis of said objective revolver means coincident with a specimen viewing axis of the microscope, said attachment means being constructed such that said revolver retaining member is dismountable therefrom and thereafter remountable thereto, after rotation relative to said ocular lens barrel through about 180° on said optical axis, by movement in each of only two direction, namely: a first direction perpendicular to said optical axis of said objective revolver means and a second direction opposite to said first direction.

* * * * *